United States Patent
Huang et al.

(10) Patent No.: US 8,049,813 B1
(45) Date of Patent: Nov. 1, 2011

(54) SYSTEM FOR TOPOLOGY BASED AUTOMATIC FOCUS

(75) Inventors: Hsiang-Chun Huang, Sinpu Township, Hsinchu County (TW); ChiHong John Ju, Fremont, CA (US)

(73) Assignee: Ambarella, Inc., Sanata Clara, CA (US)

( * ) Notice: Subject to any disclaimer, the term of this patent is extended or adjusted under 35 U.S.C. 154(b) by 21 days.

(21) Appl. No.: 12/261,402

(22) Filed: Oct. 30, 2008

Related U.S. Application Data (63) Continuation of application No. 11/837,744, filed on Aug. 13, 2007.

(51) Int. Cl.
H04N 5/232 (2006.01)

(52) U.S. Cl. ........ 348/349; 348/345; 348/354; 348/355; 348/356

(58) Field of Classification Search .......... 348/345–356; 396/72–152
See application file for complete search history.

(56) References Cited

U.S. PATENT DOCUMENTS

| | | | |
|---|---|---|---|
| 4,853,788 A * | 8/1989 | Murashima et al. | 348/355 |
| 4,992,859 A | 2/1991 | Yoshida | 348/347 |
| 5,361,095 A * | 11/1994 | Toshinobu et al. | 348/354 |
| 6,765,618 B1 | 7/2004 | Sato | 348/348 |
| 6,829,008 B1 | 12/2004 | Kondo et al. | 348/302 |
| 6,847,402 B2 | 1/2005 | Sugimoto et al. | 348/354 |
| 7,356,254 B2 | 4/2008 | Aoyama | 396/147 |
| 7,719,603 B2 | 5/2010 | Lee | 348/345 |
| 2001/0045990 A1 | 11/2001 | Yamada | 348/354 |
| 2002/0012063 A1* | 1/2002 | Kobayashi | 348/345 |
| 2002/0109784 A1* | 8/2002 | Suda et al. | 348/345 |
| 2003/0030742 A1 | 2/2003 | Ike | 348/354 |
| 2003/0063211 A1* | 4/2003 | Watanabe et al. | 348/345 |
| 2003/0160888 A1* | 8/2003 | Yoshikawa | 348/357 |
| 2003/0169363 A1* | 9/2003 | Ogino | 348/345 |
| 2003/0174231 A1 | 9/2003 | Yahagi et al. | 348/345 |
| 2004/0179128 A1 | 9/2004 | Oikawa | 348/345 |
| 2004/0227843 A1 | 11/2004 | Watanabe | 348/354 |
| 2005/0195310 A1* | 9/2005 | Yajima et al. | 348/345 |

\* cited by examiner

*Primary Examiner* — David Ometz
*Assistant Examiner* — Dwight C Tejano
(74) *Attorney, Agent, or Firm* — Christopher P. Maiorana, PC (57) ABSTRACT

A method for automatically focusing a camera including the steps of (A) recording a first topology and a second topology, where the second topology occurs temporally after the first topology, and (B) comparing the first topology with the second topology. A focus of the camera is automatically adjusted based upon one or more similarities between the first topology and the second topology.

18 Claims, 11 Drawing Sheets

SYSTEM FOR TOPOLOGY BASED AUTOMATIC FOCUS

This is a continuation of U.S. Ser. No. 11/837,744, filed Aug. 13, 2007, which is incorporated by reference.

FIELD OF THE INVENTION

The present invention relates to photography generally and, more particularly, to a system for topology based automatic focus.

BACKGROUND OF THE INVENTION

In a video camera, a position of an object lens is varied to image an object, at various distances, onto a sensor. The position of the object lens is referred to as the "focus point." The image on the sensor can be processed to measure contrast. The contrast measurement is referred to as a "focus value." The focus value can be generated by deriving a high pass signal of the image formed on the sensor. The maximum focus value occurs when the object lens is at a position where a clear and sharp image is produced on the sensor. The position where a clear and sharp image is produced on the sensor is called the "correctly-focused point."

Figure 1:
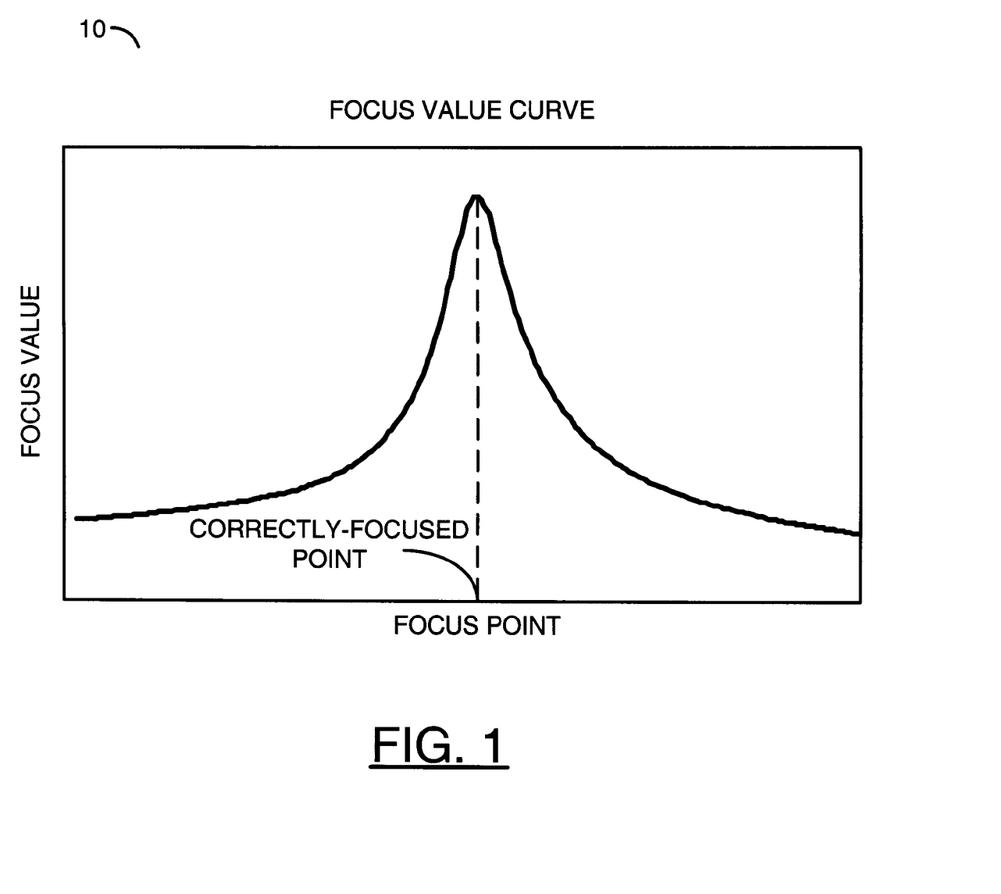
FIG. 1 is a diagram illustrating an example focus value curve.

Referring to FIG. 1, a diagram of an example focus value curve 10 is shown. The focus value curve 10 illustrates a relationship between focus value and focus point for an object at a predefined distance. The focus value appears as a "mountain-like" curve over the entire range of the focus point. The focus value reaches a maximum value when the position of the object lens corresponds to the correctly-focused point.

Automatic focus (or auto-focus) is a technique for finding and positioning the object lens on the correctly-focused point. A conventional auto-focus technique is referred to as a "full search" method. The full search method searches the entire focus point range (or region) to find the focus point corresponding to the maximum focus value (i.e., the correctly-focused point), and then positions the object lens at that point.

The full search auto-focus method can always find the correctly-focused point. However, the full search auto-focus method has several drawbacks. Firstly, to search the entire focus point range, the full search method consumes a large amount of time before finally settling at the correctly-focused point. Secondly, during the full search, the object lens moves first towards the correctly-focused point, then moves away from the correctly-focused point, and finally moves back to the correctly-focused point after searching the entire focus point region. Visually, the object appears to come into focus, go out of focus and return into focus after a while. The change in object clarity (focus) produces a poor user experience because the user expects the object to not move out of focus (i.e., become blurred) once the object is in focus (i.e., clear).

It would be desirable to have an auto-focus technique that improves focus speed and accuracy.

SUMMARY OF THE INVENTION

The present invention concerns a method for automatically focusing a camera including the steps of (A) recording a first topology and a second topology, where the second topology occurs temporally after the first topology, and (B) comparing the first topology with the second topology. A focus of the camera is automatically adjusted based upon one or more similarities between the first topology and the second topology.

The objects, features and advantages of the present invention include providing a system for topology based automatic focus that may (i) improve focus speed and accuracy for objects with low contrast, (ii) allow early termination of a full search, (iii) make focus decisions based on a relationship between focus value and focus point, (iv) make focus decisions based on topology of a focus value curve and/or (v) be used in video cameras.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

The present invention may provide a method to improve focus speed and accuracy for an object with low contrast (e.g., an object having a small peak or peaks in the focus value curve). The present invention generally uses a topology of a peak to make focus decisions. The phrase "topology of a peak" (or "topology" for short), as used herein, generally refers to a shape of the focus value curve surrounding a peak.

Figure 2:
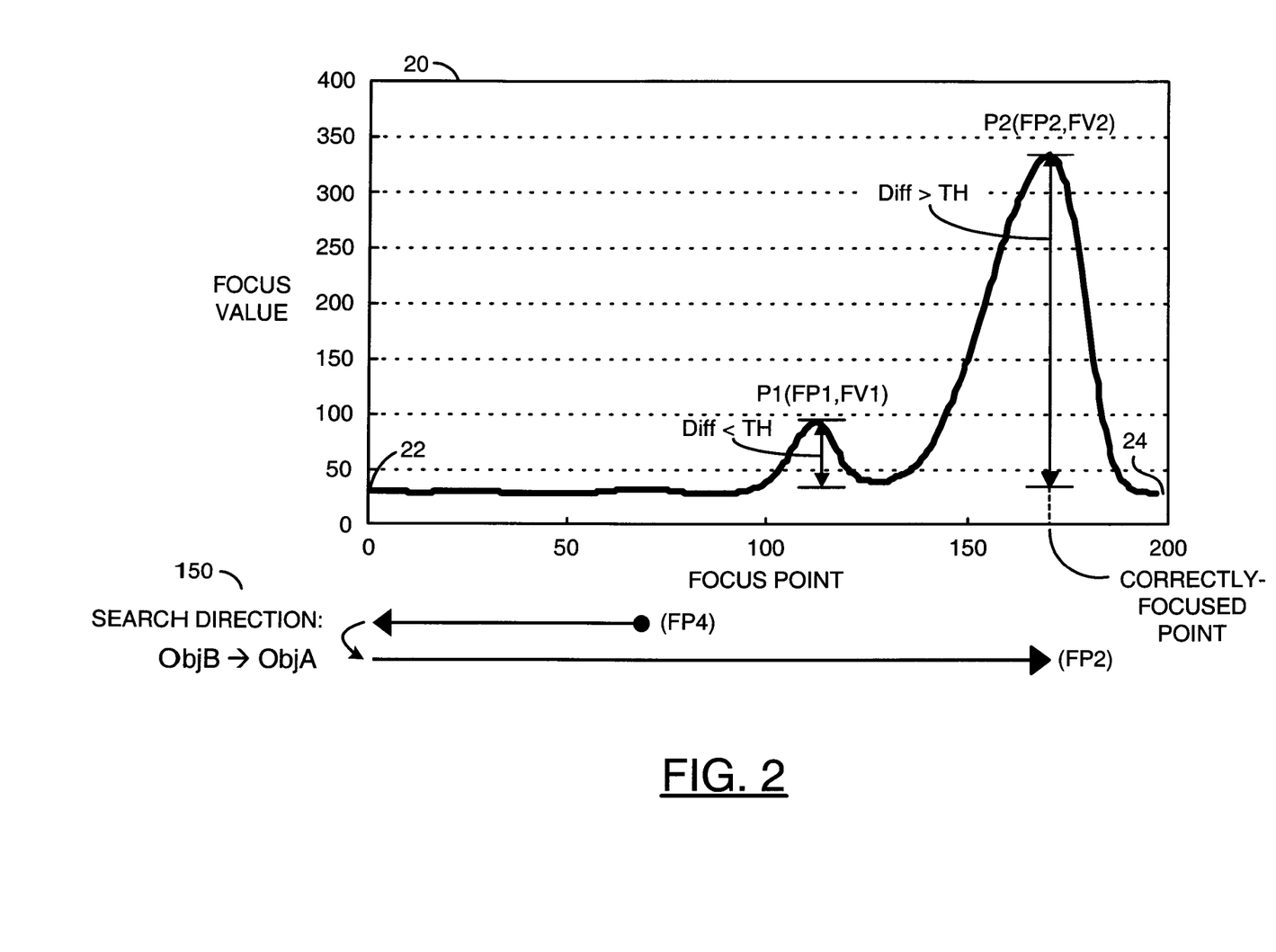
FIG. 2 is a diagram illustrating an example focus value curve of an object A.

Referring to FIG. 2, a diagram is shown illustrating an example focus value curve 20 of an object A (ObjA). In one example, the focus value curve 20 of the object A may have two peaks (e.g., P1 and P2). Local maximum focus values (FV) and related focus points (FP) of the peaks P1 and P2 may be denoted as (FP1, FV1) and (FP2, FV2), respectively. Because the peak P2 has the largest local maximum focus value the focus value FV2 may be referred to as the global maximum focus value. The correctly-focused point for the object A is at FP2. A possible solution to the disadvantages of the full search method is to directly stop the full search when a peak is detected. However, terminating the full search process early based upon detection of a peak may be problematic when there are multiple peaks in the focus value curve, because the full search may become trapped at a peak that is not the maximum peak. For example, if (i) a full search is started at a position 22 corresponding to the smallest value of the focus point range (e.g., 0) and moves toward a position 24 corresponding to the largest value of the focus point range (e.g., 200) and (ii) the full search process stops when a peak is detected, the full search process would stop when the peak P1 is encountered, and the correctly-focused point FP2 would not be reached.

To ensure that the correctly-focused point FP2 may be reached, an additional criterion may be added to the auto-focus process such that early termination of the full search process may occur only when a large peak is encountered. The determination of when a peak is large may have several possibilities. In one example, a peak may be considered large when the focus value has a significant change. In another example, a peak may be considered large when a slope of the focus value curve is larger than a predetermined threshold.

The criterion used to determine when a peak is large should be strict enough to prevent the full search process from being trapped at a local peak. For example, the criterion for determining whether a peak is a large peak may be set such that the full search process is terminated when a difference (e.g., DIFF) between the focus value of a top of the peak and the focus value of a foot of the peak is greater than a predetermined threshold value (e.g., TH). In one example, the threshold value TH may be set such that only a peak similar to the peak P2 would fulfill the criterion and the full search process would only be terminated early upon reaching such a peak. Although a strict criterion of a large peak may prevent the auto-focus process from being trapped at a local peak, the large peak criterion may also reduce the possibility of the full search process being terminated early (as explained below in connection with FIGS. 3 and 4).

Figure 3:
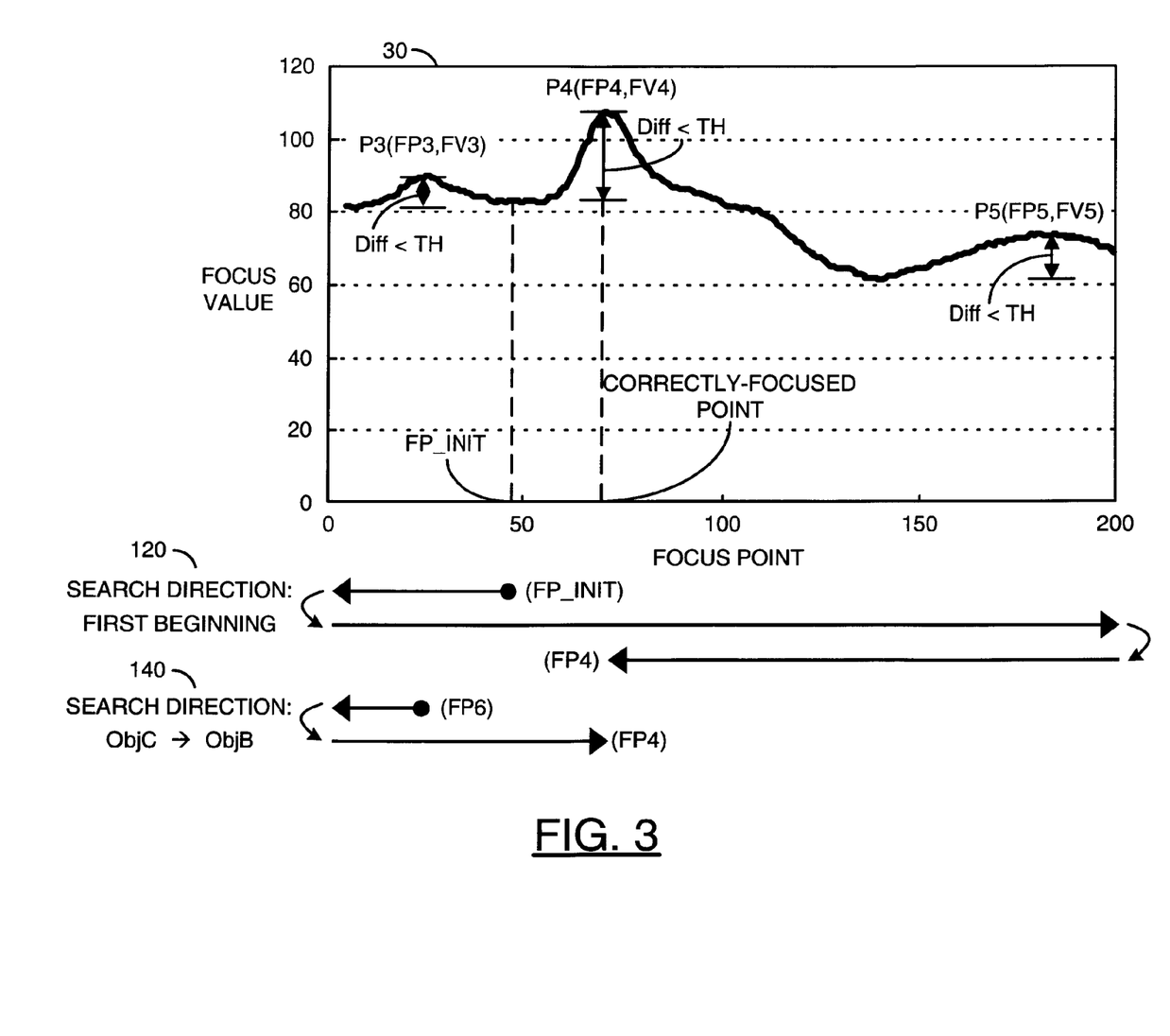
FIG. 3 is a diagram illustrating an example focus value curve of an object B.

Referring to FIG. 3, a diagram is shown illustrating an example focus value curve 30 of an object B (ObjB). In one example, the focus value curve 30 of the object B may have three small peaks, P3, P4, and P5. All of the peaks P3, P4, and P5 may have a focus value difference DIFF that is smaller than the threshold TH. An auto-focus process using only the criterion of a large peak (as discussed above in connection with FIG. 2) would not detect the maximum peak for the object B (e.g., P4) without completing a full search on the entire focus point region. For example, if the object lens starts at a position FP_INIT, the object lens may move to the focus point 0, and then to the focus point 200 before determining that the peak P4 contains the global maximum focus value and therefore is the correctly-focused point.

Figure 4:
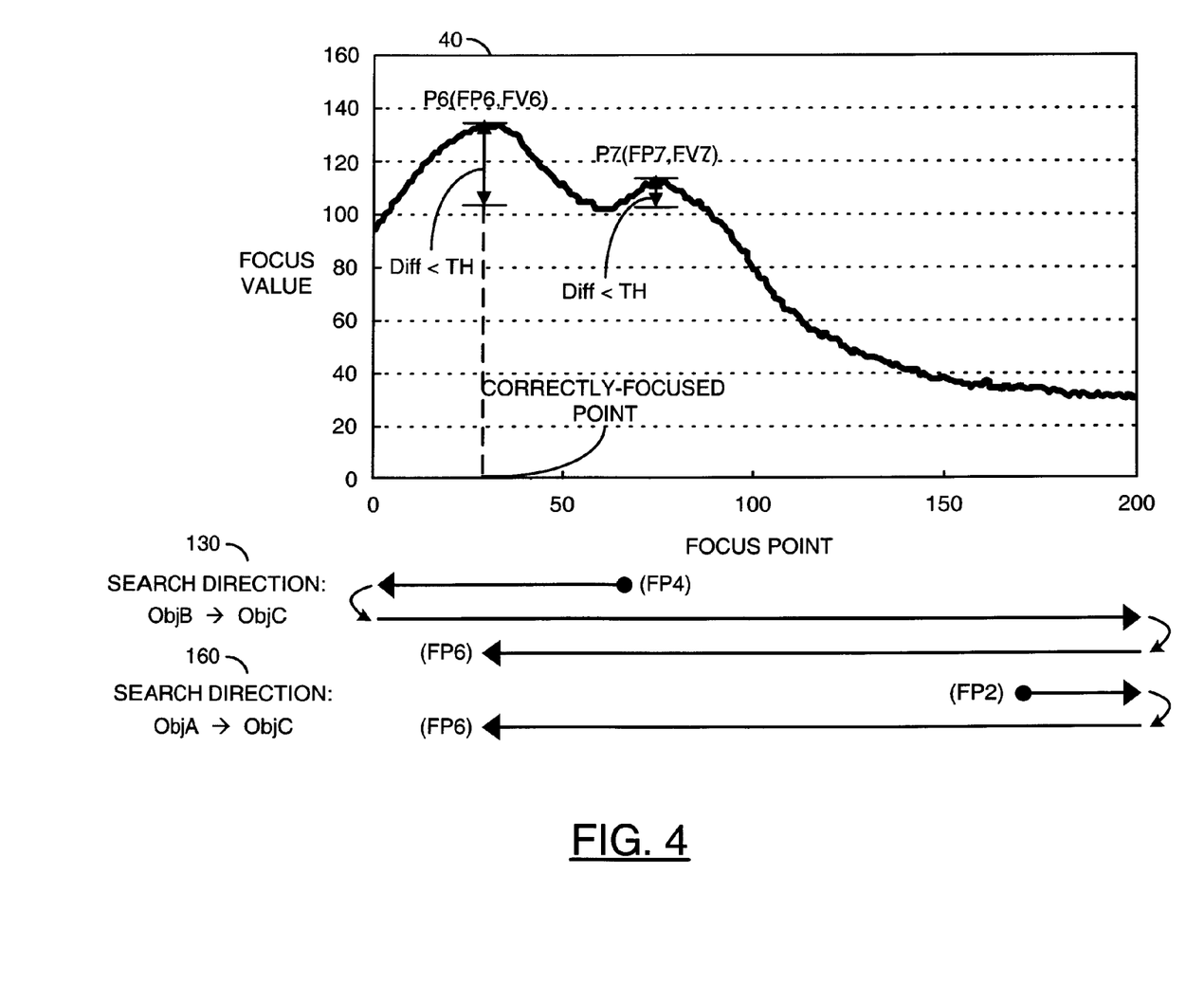
FIG. 4 is a diagram illustrating an example focus value curve of an object C.

Referring to FIG. 4, a diagram is shown illustrating an example focus value curve 40 of an object C (ObjC). In one example, the focus value curve 40 of the object C may have two small peaks, P6 and P7. Similarly to the peaks P3, P4, and P5 in FIG. 3, the peaks P6 and P7 may have respective focus value differences smaller than the threshold TH. Similarly to the object B, an auto-focus process using only the criterion of a large peak would not detect the maximum peak for the object C (e.g., P6) without completing the full search on the entire focus point region.

When using a video camera, the user may alternately image several objects. When the camera is imaging a first object that has low contrast and, therefore has a small peak, a full search cannot be terminated early. However, the topology of the peak may be recorded. The camera may then move to image a second object for a while and then return to the first object. When the camera returns to the first object, although the peak of the first object is still small, the camera may terminate the full search early when encountering the peak, because the topology of the peak is the same as the topology that was previously recorded (e.g., in a buffer).

In a preferred embodiment, the present invention may comprise establishing two queues to record the topology of the peak. The first queue may be referred to as a "full-search topology queue." The second queue may be referred to as a "recorded topology queue." The full-search topology queue may record the topology of the largest detected small peak during a full search operation. A small peak is a peak that does not fulfill the criterion of a large peak. The recorded topology queue may record the topology of the maximum small peak after a full search is finished. The recorded topology queue may record multiple topologies of the peaks for recently imaged objects. Initially, both the full-search topology queue and the recorded topology queue are empty.

Figures 5, 5A:
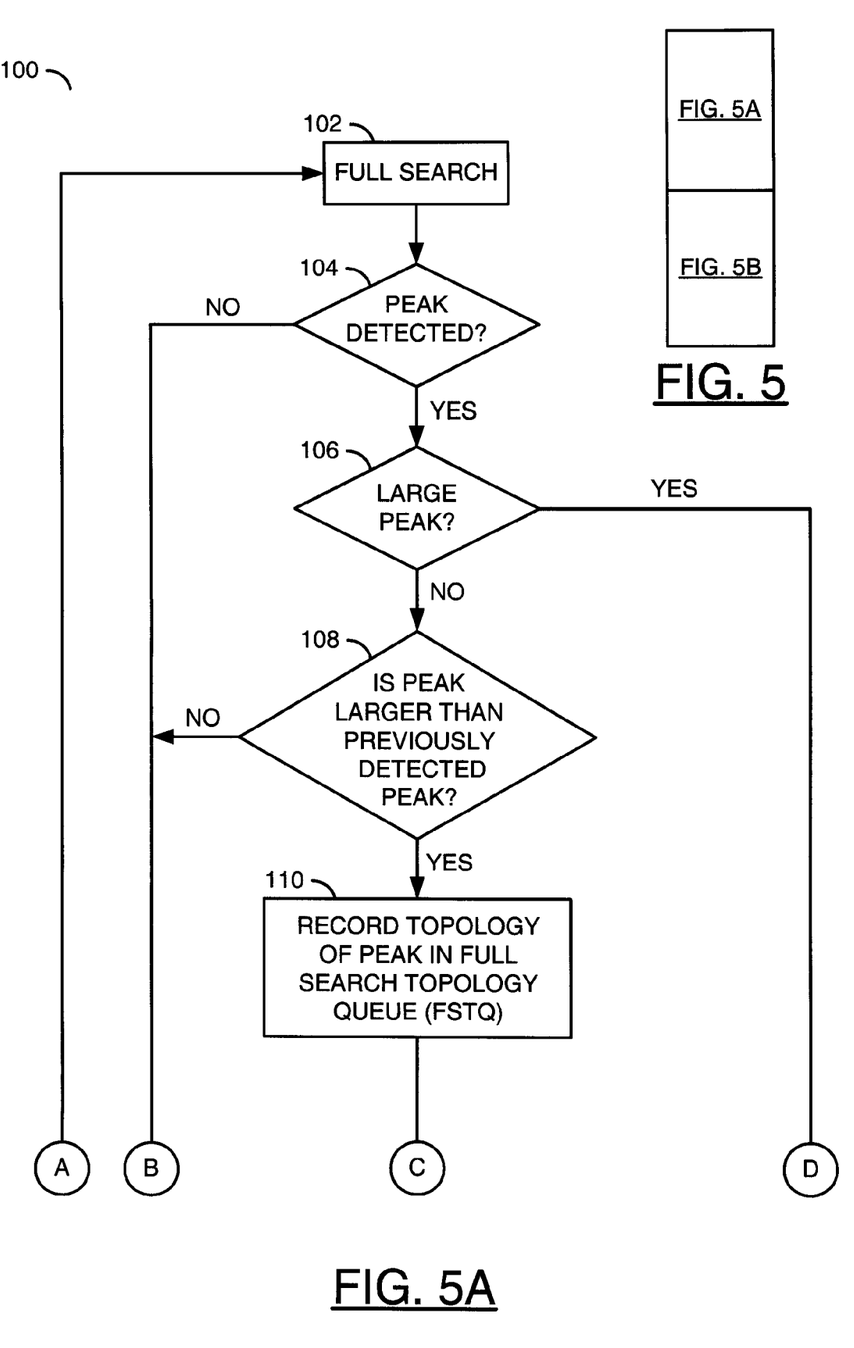
FIG. 5 is a flow diagram illustrating a topology-based auto-focus process in accordance with the present invention.
Figure 5B:
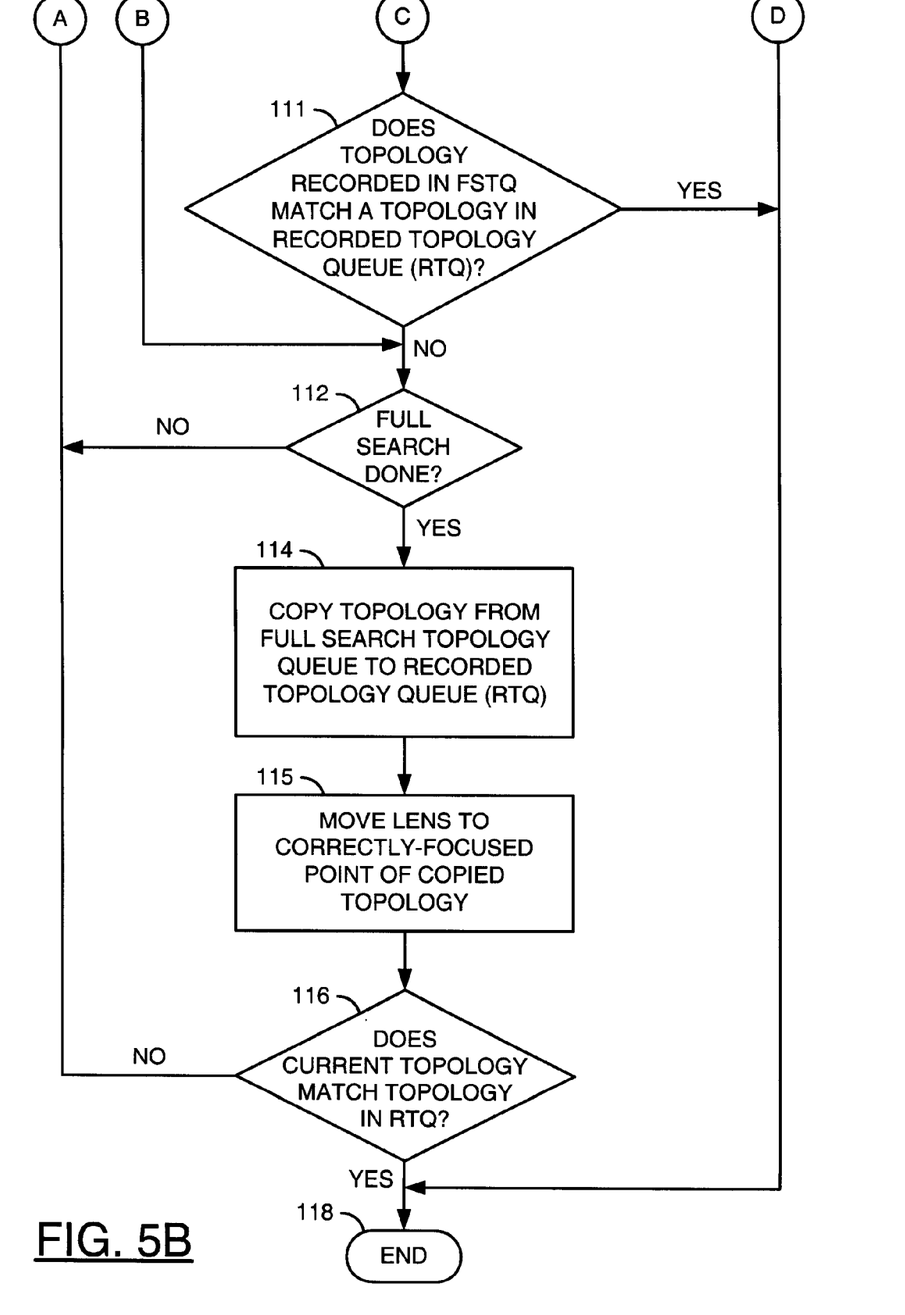

Referring to FIG. 5, a flow diagram is shown illustrating an auto-focus process 100 in accordance with the present invention. In one example, the process 100 may comprise a state (or process) 102, a state (or process) 104, a state (or process) 106, a state (or process) 108, a state (or process) 110, a state (or process) 111, a state (or process) 112, a state (or process) 114, a state (or process) 115, a state (or process) 116 and a state (or process) 118. The state 102 may comprise a full search state. The state 104 may comprise a peak detection decision state. The state 106 may comprise a large peak detection decision state. The state 108 may comprise a peak comparison decision state. The state 110 may comprise a topology recording state. The state 111 may comprise a topology matching state. The state 112 may comprise an end of full search decision state. The state 114 may comprise a topology copying state. The state 115 may comprise a focus adjustment (e.g., lens moving, etc.) state. The state 116 may comprise a topology matching state. The state 118 may comprise full search termination state.

In general, the process 100 may be initiated in the state 102 when a full search auto-focus operation is invoked. The process 100 may move to the state 104 to determine whether a peak has been detected. If no peak has been detected the process 100 may move to the state 112. When a peak is detected the process 100 may move to the state 106.

In the state 106, the process 100 generally determines whether a detected peak may be classified as a large peak or a small peak based, in one example, upon a predetermined threshold (e.g., discussed above in connection with FIG. 2). When the detected peak may be classified as a large peak, the process 100 generally moves to the state 118 and terminates the full search operation. When the peak does not meet the predetermined criteria of a large peak, the process 100 may move to the state 108.

In the state 108, the process 100 determines whether the current detected peak is larger than a previously detected peak. If the current detected peak is not larger than the previously detected peak, the process 100 may move to the state 112 and to determine whether the full search operation is complete. When the current detected peak is larger than the previously detected peak, the process 100 may move to the state 110.

In the state 110, the process 100 records the topology of the current detected peak (e.g., in a full search topology queue (FSTQ)). When the topology has been recorded, the process 100 may move to the state 111. In the state 111, the process 100 may compare the topology recorded in the full search topology queue with one or more topologies stored in a recorded topology queue (RTQ). When the topology in the full search topology queue matches a topology in the recorded topology queue, the process 100 may move to the state 118. When the topology in the full search topology queue matches none of the topologies in the recorded topology queue, the process 100 may move to the state 112.

In the state 112, the process 100 checks to see whether the full search operation is complete (e.g., the entire focus point range has been examined). If the full search operation is not complete, the process 100 may return to the state 102 and continue the full search operation. When the full search operation is complete, the process 100 may move to the state 114.

In the state 114, the process 100 may copy (or transfer) the topology recorded in the full search topology queue to a slot in the recorded topology queue. When the topology has been copied to the recorded topology queue, the process 100 may move to the state 115. In the state 115, the process 100 may adjust the focus (e.g., move the camera lens, etc.) to the correctly-focused point. When the focus has been set at the correctly-focused point, the process 100 may move to the state 116.

In the state 116, the process 100 may compare the topology of the current peak to the topology recorded in the recorded topology queue to ensure that the scene on which the camera is focused has not changed since the current peak was detected. If the topology of the current peak does not match the topology recorded in the recorded topology queue (e.g., the lens is focused on a different object or the object has moved), the process 100 may move to the state 102 and begin a new full search. When the topology of the current peak matches the topology recorded in the recorded topology queue, the process 100 may move to the state 118 and terminate the search.

Referring back to FIG. 3, a diagram 120 is shown illustrating an example search process. With the camera initially imaging the object B (which has the focus value curve 30) and with the object lens initially positioned at the focus point FP_INIT, to search the entire focus point range, the object lens may be moved to one focus point boundary (e.g., focus point value 0), and then moved to the other focus point boundary (e.g., focus point 200). In an example where the object lens is always moved to the closer boundary, which is the small focus point boundary in this case, a peak detection method (or process) may detect the peak P3 as a small peak (e.g., DIFF<TH). The topology of the peak P3 may be recorded in the full-search topology queue using a topology recording method (or process) in accordance with the present invention. As the lens continues moving to the small focus point, the peak detection method does not detect any further peaks. After reaching the small focus point boundary, the full search may be started again with the lens moving towards the large focus point boundary. The full search is performed again because the focus points between the point FP_INIT and the large focus point boundary were not covered in the previous full search operation. The data recorded in the full-search topology queue may be reset (or erased) because the peak(s) detected in the previous full search (e.g., P3) will be detected again during the new full search.

In the process of moving the lens towards the large focus point boundary, the peak detection method again detects the peak P3 as a small peak, and the topology recording method records the topology of peak P3 in the full-search topology queue. The peak detection method then detects the peak P4, and determines that the peak P4 is a small peak (e.g., DIFF<TH) that is larger than the previously recorded peak P3. The topology recording method updates the full-search topology queue with the topology of the peak P4. The full-search topology queue is updated because only the topology of the largest peak could contain the correctly-focused point and is to be recorded. Finally, the peak detection method detects the peak P5 and determines that the peak P5 is smaller than the peak P4. The topology of the peak P5 is not recorded because the peak P5 is not the largest peak and, therefore, cannot contain the correctly-focused point.

After reaching the large focus point boundary, the peak P4 is determined to be the maximum peak. The topology of the peak P4 is copied from the full-search topology queue to the first element of the recorded topology queue. The lens is then moved back to the focus point of the peak P4 (e.g., FP4). Although the peak P4 has been determined to be the maximum peak, a scene change may have occurred after the full search passed the peak P4. A topology matching method (or process) in accordance with the present invention may be used to ensure that the current topology (e.g., the topology around the peak P4) is still the same as the topology recorded in the recorded topology queue. If the topologies are different, the scene may have changed and the full search should be performed again. The above process may improve the accuracy of an auto-focus operation on an object with a small peak (or low contrast).

Referring back to FIG. 4, a diagram 130 is shown illustrating another example where the camera is directed from the object B to the object C, which has the focus value curve shown in FIG. 4. A scene change detection method (or process) in accordance with the present invention may be performed to determine whether the scene has changed. When the scene has changed, the scene change detection method may invoke the full search process. In one example, the scene change detection method may comprise any process configured to determine whether the peak of the previously imaged object (e.g., the peak P4) no longer exists.

The full search process may initially move the lens from the current position (e.g., FP4) towards the small focus point boundary, and the peak detection method may detect the peak P6 as a small peak. The topology of the peak P6 may be recorded in the full-search topology queue. The topology matching method may compare the topology recorded in the full-search topology queue with the topology recorded in the recorded topology queue. When the topology matching method determines that there is no conformity between the peak P6 and the recorded topology in the recorded topology queue (e.g., the topology of the peak P4), the lens may continue moving towards the small focus point boundary, until the small focus point boundary is reached.

Because there is no large peak detected and the full search has not been applied to the portion of the focus point range between the point FP4 and the large focus point boundary, the full search is invoked again with the lens moving toward the large focus point boundary. Similarly, the process of peak detection and topology matching may continue until the large focus point boundary is reached. The topology of the maximum peak, which in the above example is the peak P6, is recorded in the recorded topology queue. Note there are two topologies in the recorded topology queue now, one is the topology for the peak P4 and the other is the topology for the peak P6. The lens is moved back to the position of the peak P6. The topology matching method may be invoked to make sure that no scene change has occurred after the full search process passed the peak P6.

Referring again to FIG. 3, a diagram 140 is shown illustrating a third example auto-focus operation where the camera is directed from the object C back to the object B. The scene change detection method detects the change and invokes the full search process. The lens is initially moved toward the small focus point boundary, and then moved back after reaching the small focus point boundary. The peak P3 is detected and recorded in the full-search topology queue, but no conformity is found between the topology of the peak P3 and the topology recorded in the recorded topology queue (e.g., the topologies of the peaks P4 and P6). The full search continues and the peak detection method detects the peak P4. Upon detection of the peak P4, the topology recording method updates the full-search topology queue and the topology matching method is invoked. The topology matching method finds there is conformity between the topology of the peak P4 in the full-search topology queue and the topologies recorded in the recorded topology queue. Although the peak P4 is a small peak, the full search process may be terminated early based upon the matching topology. So that the most recent topology of the same object is recorded, the topology of the peak P4 in the recorded topology queue may be updated with the new topology recorded in the full-search topology queue.

Referring again to FIG. 2, a diagram 150 is shown illustrating a fourth example of an auto-focus operation where the camera is directed from the object B back to the object A. The lens initially moves toward the small focus point boundary, and no peak is found. The lens is then moved towards the large focus point boundary. The peak P1 is detected as a small peak (e.g., DIFF<TH) and the topology of the peak P1 is recorded in the full-search topology queue. The topology matching method finds no conformity between the topology of the peak P1 in the full-search topology queue and the recorded topologies in the recorded topology queue and the lens continues to move. The peak detection method then detects the peak P2. The peak P2 is a peak that fulfills the criterion of a large peak (e.g., DIFF>TH) and the full search process is terminated. No topology is generally recorded for a large peak.

Referring again to FIG. 4, a diagram 160 is shown illustrating a fifth example of an auto-focus operation where the camera is directed from the object A back to the object C. The lens initially moves from the point FP2 towards the large focus point boundary, and no peak is detected. The lens then moves towards the small focus point boundary. The peak P7 is detected as a small peak, and the topology of the peak P7 is recorded in the full-search topology queue. The topology matching method finds no conformity between the topology in the full-search topology queue and the recorded topologies in the recorded topology queue and the lens continues to move. The peak detection method then detects the peak P6 as a small peak. The topology matching method finds conformity between the topology in the full-search topology queue (e.g., the current topology of the peak P6) and the recorded topologies in the recorded topology queue (e.g., the previously recorded topology of the peak P6), and the full search is terminated. The topology of the peak P6 in the recorded topology queue is updated with the current topology of the peak P6 in the full-search topology queue.

A similar process may be applied each time a scene change is detected. The number of the topologies recorded in the recorded topology queue generally depends on the amount of memory and complexity constraints. In one example, a queue maintenance process may be implemented when the recorded topology queue is full. For example, the topology that has not been updated for the longest period of time may be removed to make room for future recording. However, other queue maintenance processes may be implemented to meet the design criteria of a particular implementation.

Figure 6:
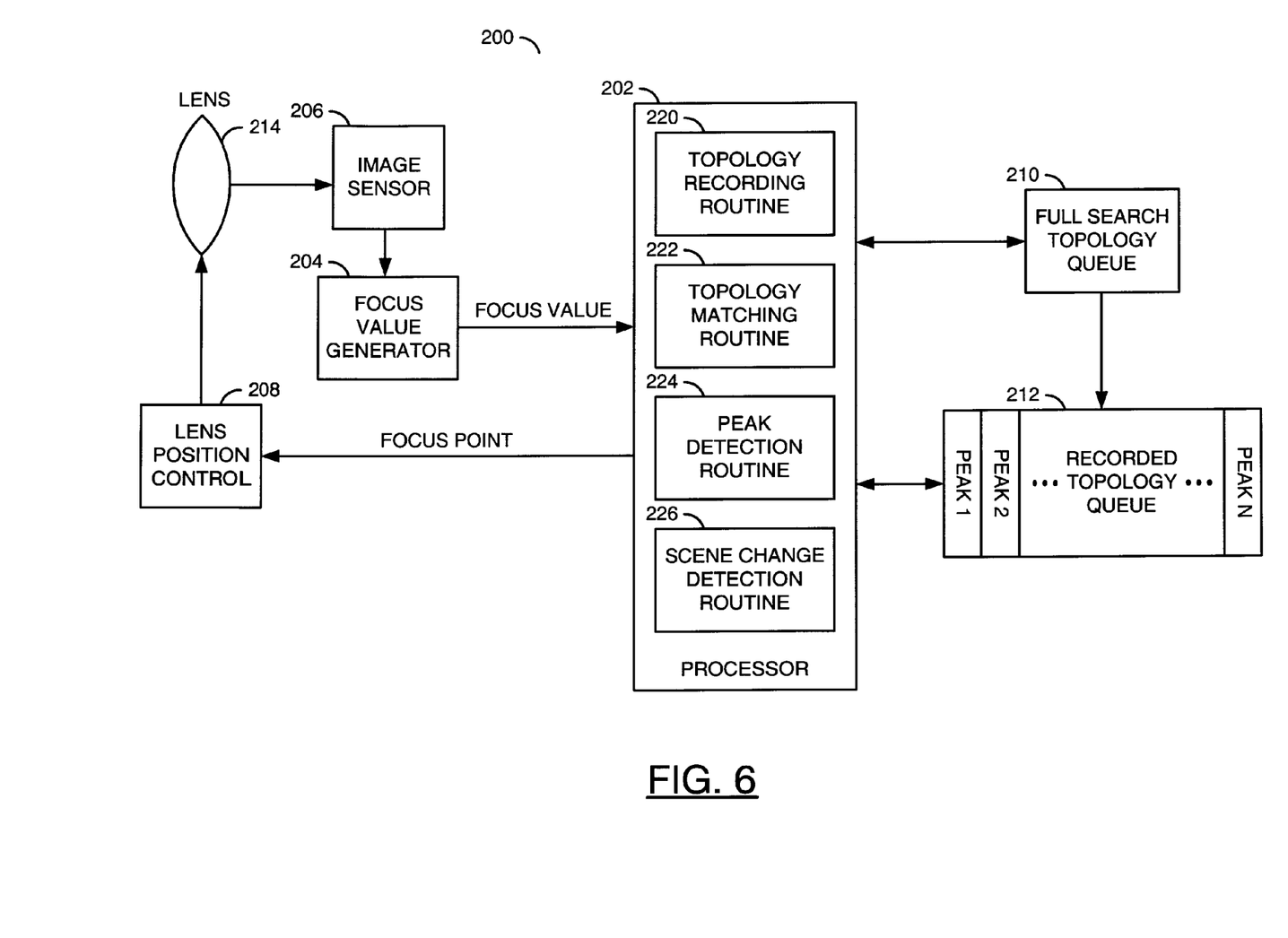
FIG. 6 is a block diagram illustrating a system in accordance with the present invention.

Referring to FIG. 6, a block diagram is shown illustrating a system 200 implementing an auto-focus process in accordance with a preferred embodiment of the present invention. The system 200 may be implemented, in one example, as part of a camera. In one example, the camera may comprise a digital video camera. The system 200 may comprise a block 202, a block 204, a block 206, a block 208, a block 210 and a block 212. The block 202 may be implemented as a processor block (or circuit). In one example, the block 202 may be implemented using an image signal processor (ISP) or digital signal processor (DSP). The block 204 may be implemented, in one example, as a focus value generator block (or circuit).

The block 206 may be implemented, in one example, as an image sensor (e.g., photo multiplier, CCD, etc.). The block 208 may be implemented, in one example, as a lens position control block (or circuit). The block 210 may be implemented as a full-search topology queue. The block 212 may be implemented as a recorded topology queue.

The block 202 may have (i) an input that may receive a signal (e.g., FOCUS_VALUE) from an output of the block 204, (ii) an output that may present a signal (e.g., FOCUS_POINT) to an input of the block 208, (iii) a first interface that may communicate with a first interface of the block 210 and (iv) a second interface that may communicate with a first interface of the block 212.

The block 204 may have an input that may receive data from an output of the block 206. In one example, the data may comprise information related to an image (or picture) projected upon the block 206 by a lens 214. The block 204 may be configured to generate the signal FOCUS_VALUE in response to the data received from the block 206. In one example, the block 204 may be configured to generate the signal FOCUS_VALUE in response to a contrast measurement performed on data representing the image projected upon the block 206.

The block 208 may be configured to control a position of the lens 214 in response to the signal FOCUS_POINT. In one example, the block 208 may comprise a motor or other mechanical device for moving (or positioning) the lens 214. In another example, the block 208 may comprise electronic components configured to control one or more mechanical devices configured to position the lens 214.

The block 210 may have a second interface that may be configured to communicate with a second interface of the block 212. The block 210 and 212 may be implemented, for example, as storage devices. In one example, the blocks 210 and 212 may be implemented as separated memory devices. In another example, the blocks 210 and 212 may be implemented as separate portions of a single memory device.

The block 202 may be configured to perform number of routines in accordance with the present invention. In one example, the block 202 may be configured to perform a routine 220, a routine 222, a routine 224 and a routine 226. The routine 220 may be configured to implement the topology recording process (discussed above). The routine 222 may be configured to implement the topology matching process (discussed above). The routine 224 may be configured to implement the peak detection process (discussed above). The routine 226 may be configured to implement the scene change detection process (discussed above). In one example, the routines 220-226 may be implemented in firmware or software. For example, the routines 220-226 may be implemented using computer executable instructions stored in a computer readable medium. In one example, the computer readable medium may be implemented as part of the block 202. In another example, the computer readable medium may be implemented separately from the block 202.

Figure 7:
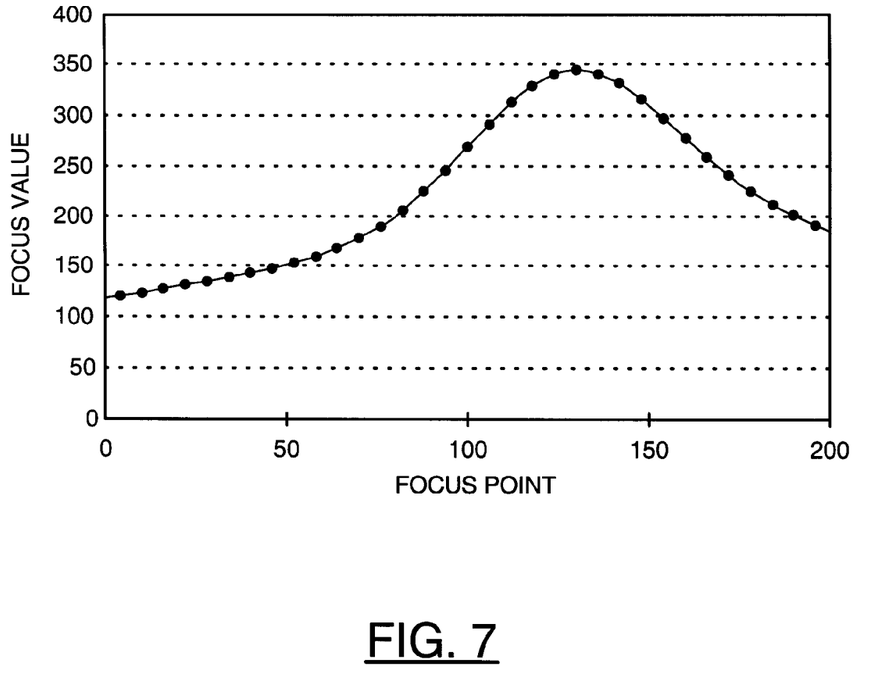
FIG. 7 is a diagram illustrating sampling points on a focus value curve.

Referring to FIG. 7, a diagram is shown illustrating an example of sampling points on a focus value curve. During a full search, the searched focus point actually may include fewer than all the focus points between the small focus point boundary and the large focus point boundary. For example, the searched focus points may comprise a number of sampling positions. In one example, the search may be limited to the sampled focus points (e.g., illustrated by a dot symbol) because searching the entire focus point range may consume too much time. The down-sampled focus value curve may still provide enough accuracy to find the maximum peak as long as the sampling rate is high enough. In the topology recording method in accordance with the present invention, the focus values corresponding to the searched focus points surrounding the peak may be recorded in the full-search topology queue or the recorded topology queue. In one example, the number of the points stored in the topology queues may depend on the slope of the focus value curve.

Figure 8:
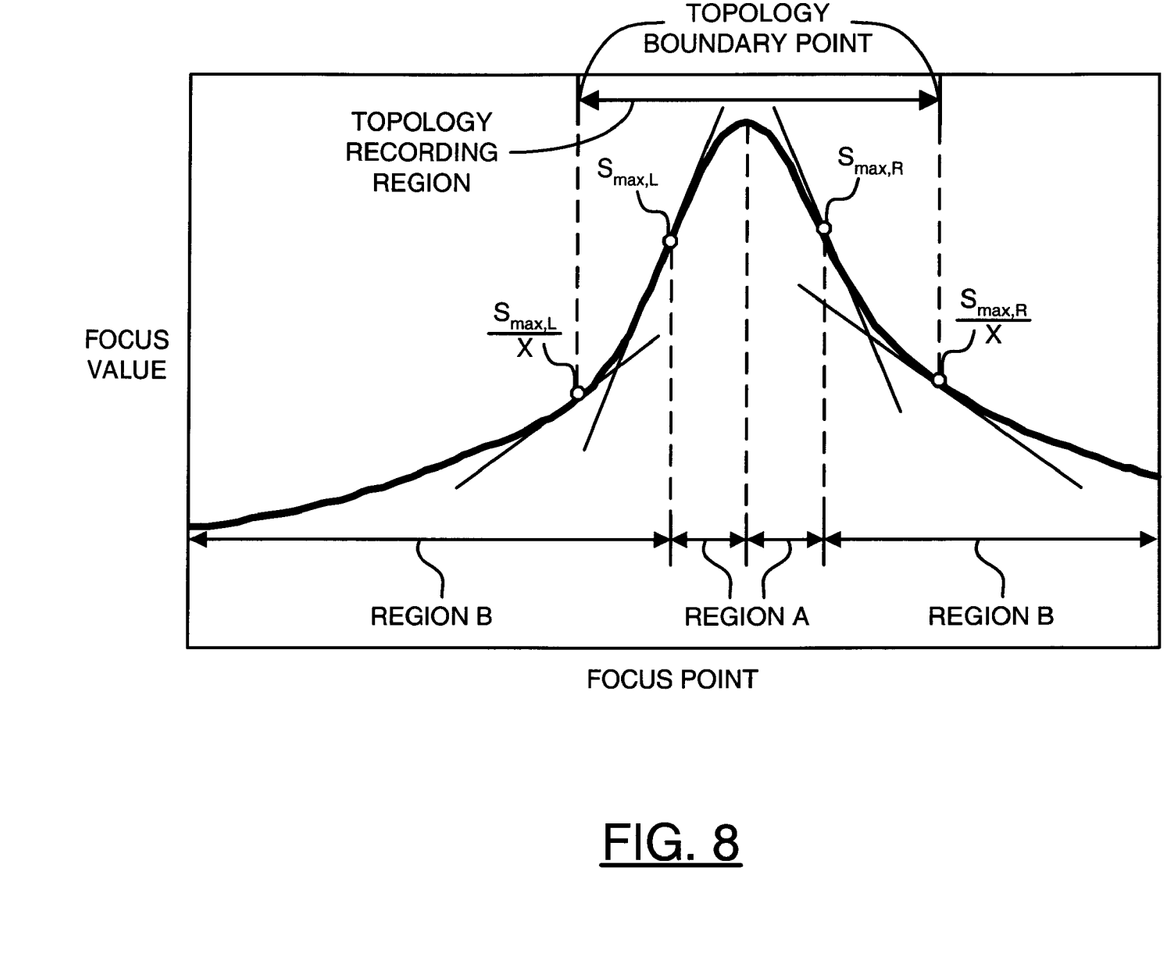
FIG. 8 is a diagram illustrating a topology recording region in accordance with the present invention.

Referring to FIG. 8, a diagram is shown illustrating an example topology recording region in accordance with the present invention. In general, the slope of the focus value curve may be substantially zero at the correctly-focused point. On each side of the peak, the slope may start to increase and reach a maximum value (e.g., $S_{max}$) at some point along the "mountainside." The slope may then begin to decrease as the focus point moves farther away from the correctly-focused point. Taking the right side of the peak in FIG. 8 as an example, the maximum slope value on the right side of the peak may be denoted as $S_{max,R}$. The focus points to be recorded in the topology queues may be defined as the points between the correctly-focused point and the point that has a slope equal to $S_{max,R}/X$ where X is a configurable variable equal to or greater than one (e.g., $X \geqq 1$). The point where the slope is equal to $S_{max,R}/X$ may be referred to as a "topology boundary point". The topology boundary point may be either between the correctly-focused point and the point that has maximum slope (e.g., illustrated by the regions A in FIG. 8), or outside of the regions A (e.g., illustrated by the regions B in FIG. 8). When the topology boundary point is in the region A, a larger value of X generally leads to fewer points recorded in the queue. When the topology boundary point is in the region B, a larger value of X generally leads to more points recorded in the queue. More points stored in the topology queue may improve the accuracy of the topology matching, but also uses more memory space and computation complexity. A similar method may be applied on the left side of the peak.

Figure 9:
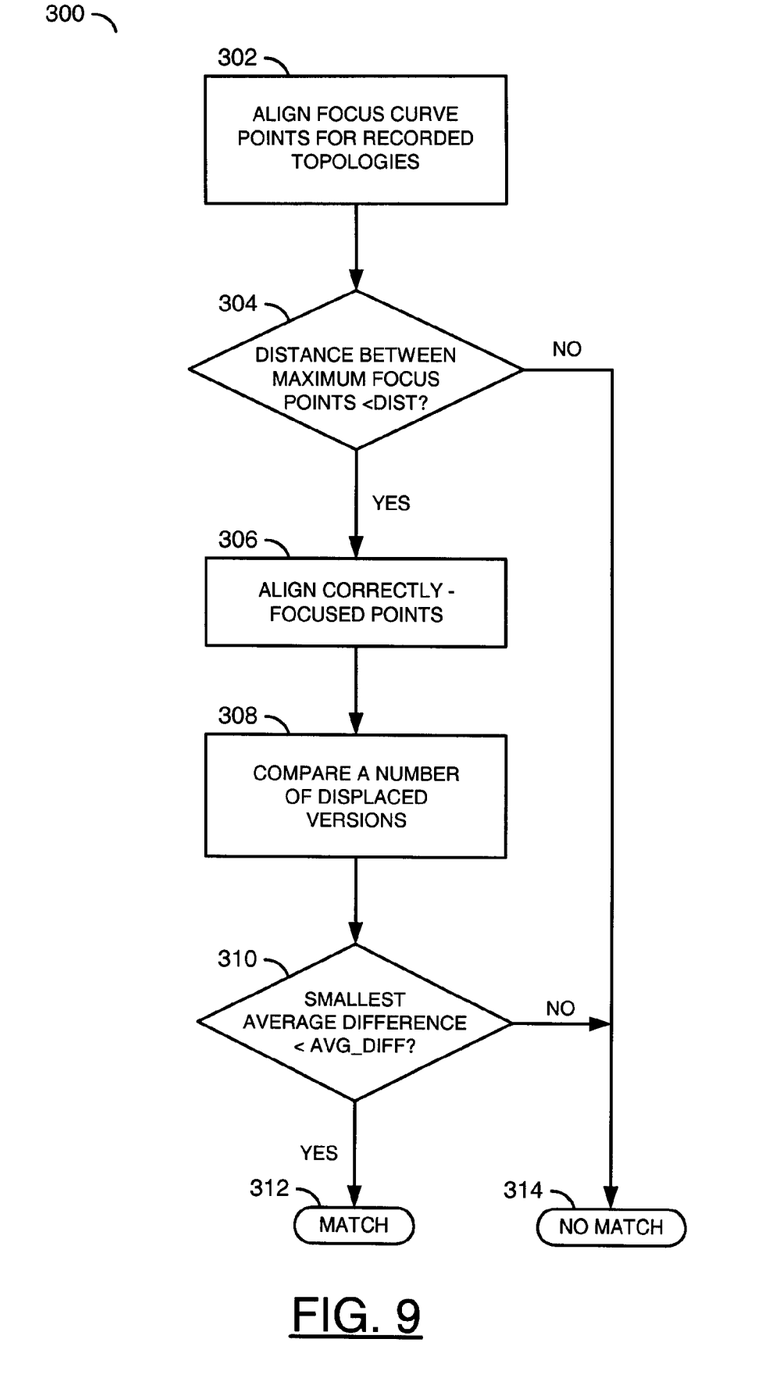
FIG. 9 is a flow diagram illustrating a topology matching process in accordance with the present invention.

Referring to FIG. 9, a flow diagram is shown illustrating the topology matching process 300 in accordance with preferred embodiment of the present invention. The topology matching process 300 may be used to compare two topologies, where one topology is stored in the full-search topology queue and another is stored in the recorded topology queue. In one example, the topology matching process 300 may comprise a state (or process) 302, a state (or process) 304, a state (or process) 306, a state (or process) 308, a state (or process) 310, a state (or process) 312 and a state (or process) 314. The state 302 may be implemented as a focus points alignment state. The state 304 may be implemented as decision state. The state 306 may be implemented as a topology alignment state. The state 308 May be implemented as a comparison state. The state 310 may be implemented as a decision state. The state 312 may be implemented as a match found state. The state 314 may be implemented as a no match state.

The process 300 may begin in the state 302. In the state 302, the process 300 may align the points of the focus value curves from the recorded topologies. In one example, searched points of the topologies may be down-sampled to reduce the amount of storage space used. In another example, searched points of the topologies may be down-sampled to reduce the amount of time a search takes. For example, a search may involve looking at sample points spread across the entire focus point range (e.g., see FIG. 7). A search using sampling points to cover the topology may have a reduced search time because the search does not involve all the focus points that make up the focus value curve for the topology.

When the searched points are down-sampled, recorded topologies of the same object may have points that are not at the same sampling position. In one example, the process 300 may interpolate the recorded points to generate all the focus points of the focus value curve of the respective topology before starting the matching process. In another example, the process 300 may filter one or more of the recorded topologies being compared such that the focus points of the topologies are aligned. When all of the focus points of the topologies being compared are aligned, the process 300 may move to the state 304.

In the state 304, the process 300 may begin the matching process by making an initial check to determine whether the respective focus points having the maximum focus value for the two topologies are sufficiently close to each other. In one example, if the distance between the respective focus points is greater than or equal to a predetermined threshold (e.g., DIST), the two topologies may be considered to be different and the process 300 may move to the no match state 314. For example, the two topologies may be considered to be different because an object may have a different topology when placed at a different distance, such that a comparison of the two topologies at different focus point ranges may not be meaningful. When the distance between the respective maximum focus points is less than the predetermined threshold DIST, the process 300 may move to the state 306.

In the state 306, the process 300 may align the maximum focus points of the two topologies. When the topologies are aligned, the process 300 may move to the state 308. In the state 308, the process 300 may compare differences between focus values of the two topologies. In one example, the process 300 may compare differences between focus values with the two topologies at a number of displacements (e.g., described in more detail below in connection with FIG. 10). In one example, an average of the differences between focus values (e.g., sum of the differences between focus values divided by number of focus values) may be determined for each displacement. In another example, a weighted average may be implemented (e.g., different displacements may be associated with different weights, focus values at different focus points may be assigned different weights, etc.).

When the topologies have been compared, the process 300 may move to the state 310. In the state 310, the process 300 may determine whether a smallest one of the average (or weighted average) differences between the two topologies is less than a predetermined threshold value (e.g., AVG_DIFF). If the smallest average (or weighted average) difference between the two topologies is not less than the predetermined threshold value AVG_DIFF, the process 300 may move to the no match state 314. When the smallest average difference between the two topologies is less than the predetermined threshold value AVG_DIFF, the process 300 may move to the match state 312.

The predetermined thresholds DIST and AVG_DIFF may be predetermined (e.g., set, optimized, etc.) for each lens/sensor/DSP system as a whole. In one example, the thresholds DIST and AVG_DIFF may be implemented as programmable values. In one example, each of the thresholds DIST and AVG_DIFF may be determined using a linear equation (e.g., y=mx+b).

In one example, a value for the threshold DIST may be determined using the following Equation 1:

$$\text{DIST} = (\text{Focus Point Range } X \text{ PFR}) + \text{OFR}, \qquad \text{Eq. 1}$$

where PFR represents a percentage of the whole focus point range and OFR represents an optional system dependent offset for optimizing the threshold DIST to the particular system. For example, in a system implemented with a focus point range of 0-200, a PFR of 5% and an OFR of zero, the threshold DIST would have a value of ten (200×5%+0=10). In another example, a system implemented with a focus point range of 0-200, a PFR of 4% and an OFR of 5, would have a threshold DIST value of 13 (200×4%+5=13).

In one example, a value for the threshold AVG_DIFF may be determined using the following Equation 2:

$$\text{AVG\_DIFF} = (\text{Maximum Focus Value} \times PFV) + OFV,\quad \text{Eq. 2}$$

where Maximum Focus Value represents the focus value at the correctly-focused point, PFV represents a percentage of the maximum focus value and OFV represents an optional system dependent offset for optimizing the threshold to the particular system. For example, in a system with an PFV of 2.5%, an OFV of zero and a topology with a focus value of 100 at the correctly-focused point, the threshold AVG_DIFF would be 2.5 (e.g., 100×2.5%+0=2.5).

In general, each topology to be compared may have a respective focus value corresponding to the correctly-focused point of the particular topology. In one example, when the value PFV is implemented as a small percentage (e.g., 2.5%), either the respective focus value corresponding to the correctly-focused point of the particular topology or an average of the respective focus values of the compared topologies may be used to determine the value of the threshold AVG_DIFF with similar results. In another example, the Maximum Focus Value (e.g., the focus value at the correctly-focused point) in Equation 2 may be replaced by an average focus value for one or more focus points in the one or more topologies being compared. However, other methods may be implemented for determining the values for the thresholds DIST and AVG_DIFF to meet the design criteria of a particular implementation.

Figure 10:
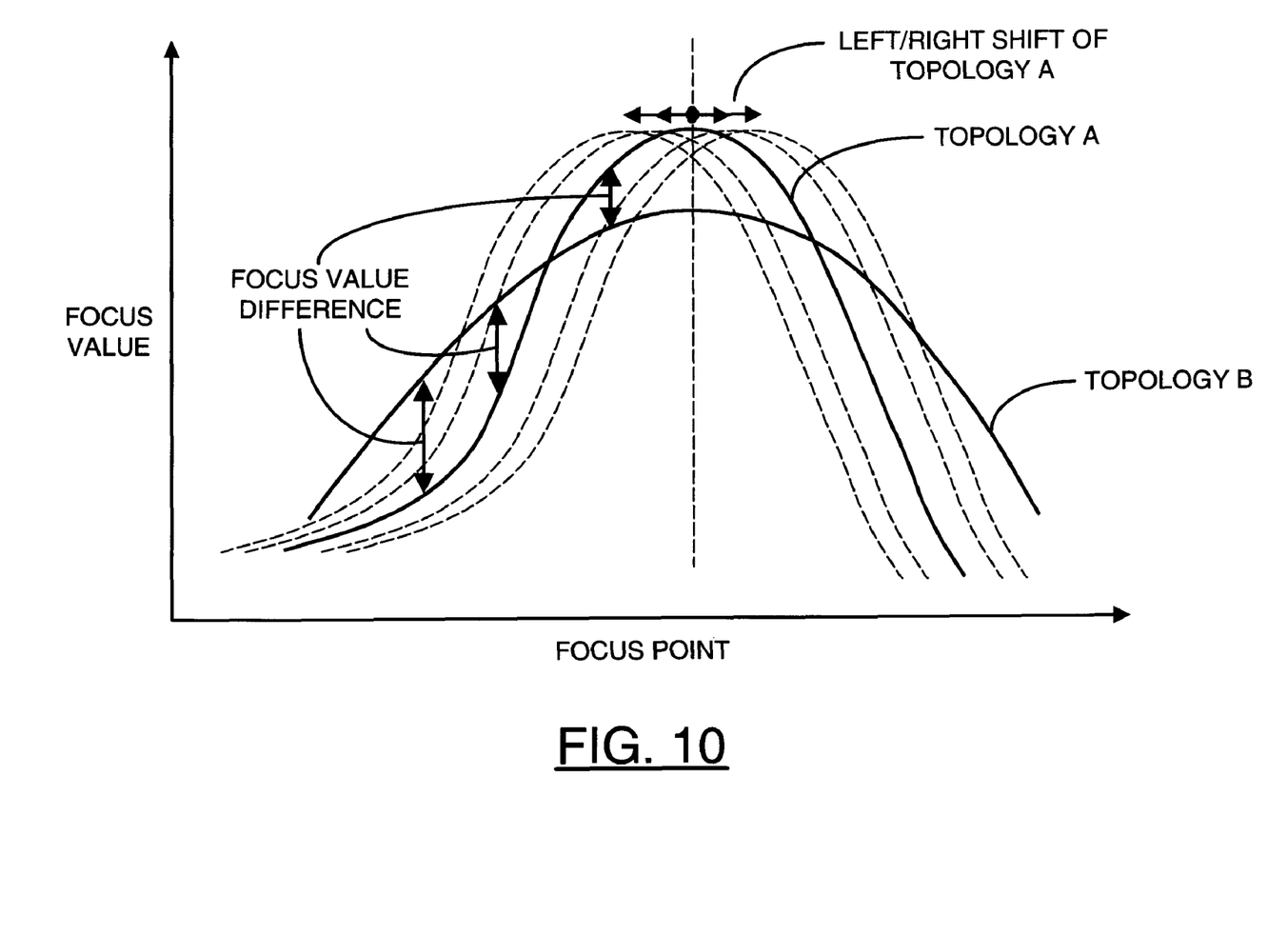
FIG. 10 is a diagram illustrating a topology matching technique in accordance with the present invention.

Referring to FIG. 10, a diagram is shown illustrating a topology matching technique in accordance with a preferred embodiment of the present invention. When the two topologies have similar focus point ranges, the two topologies may be positioned to align the respective correctly-focused points of the two topologies. The focus value difference between focus values at each focus point of the two topologies may be determined.

To eliminate effects of noise, or some minor movement of the object on the topologies, one of the topologies may be moved (displaced, shifted, etc) slightly (e.g., shifted several points) and average (or weighted average) focus value differences may be determined in each of the displacements. In one example, an average of the differences between focus values (e.g., sum of the differences between focus values divided by number of focus values) may be determined for each displacement. In another example, a weighted average may be implemented (e.g., different displacements may be associated with different weights, focus values at different focus points may be assigned different weights, etc.). The smallest average (or weighted average) focus value difference among all the displacements may be recorded. When the smallest average (or weighted average) focus value difference is smaller than the predetermined threshold AVG_DIFF, the two topologies may be considered to be the same. Otherwise, the two topologies are considered to be different.

While the invention has been particularly shown and described with reference to the preferred embodiments thereof, it will be understood by those skilled in the art that various changes in form and details may be made without departing from the spirit and scope of the invention.

The invention claimed is:

1. A camera comprising:
   a first queue;
   a second queue;
   a processor coupled to said first queue and said second queue and embodying routines that, when executed by said processor, cause said processor to
   (i) record a first topology in said first queue and a second topology in said second queue, wherein said first topology and said second topology each comprise a plurality of points and recording of said second topology is started after said first topology is completely recorded, and
   (ii) compare said first topology with said second topology, wherein a focus of said camera is automatically adjusted based upon one or more similarities between said first topology and said second topology.

2. The camera according to claim 1, wherein said routines embodied in said processor, when executed by said processor, further cause said processor to:
   copy said second topology to said first queue;
   record a third topology in said second queue, wherein recording of said third topology is started after recording of said first topology and said second topology are completed; and
   compare said third topology with at least one of said first topology and said second topology, and
   adjust the focus of said camera based upon one or more similarities between said third topology and the at least one of said first topology and said second topology.

3. The camera according to claim 2, wherein said routines embodied in said processor, when executed by said processor, further cause said processor to
   (i) copy said third topology to said first queue,
   (ii) record one or more subsequent topologies after said first topology, said second topology and said third topology in said second queue, wherein recording of each of said one or more topologies starts after previous topologies are completely recorded,
   (iii) compare each subsequent topology recorded in said second queue with at least one topology stored in said first queue,
   (iv) copy each subsequent topology recorded in said second queue to said first queue when one or more predetermined criteria are met, and
   (v) adjust the focus of said camera based upon one or more similarities between each subsequent topology recorded in said second queue and the at least one topology stored in said first queue.

4. The camera according to claim 3, wherein said processor is further configured to automatically adjust a position of a lens based upon one or more criteria selected from the group consisting of (i) a predetermined threshold and (ii) one or more similarities between the recorded topology in said second queue and one or more topologies recorded in said first queue.

5. The camera according to claim 4, wherein said predetermined threshold defines a large peak upon which a full search is to be terminated.

6. The camera according to claim 1, wherein said first topology is recorded as a plurality of samples and said processor reconstructs said first topology by interpolating said plurality of samples prior to comparison with said second topology.

7. The camera according to claim 1, wherein said routines embodied in said processor, when executed by said processor, further cause said processor to record (i) a focus value for at least one focus point of a first peak and (ii) a focus value for at least one focus point of a second peak, respectively.

8. The camera according to claim 7, wherein said focus point is a function of lens position.

9. The camera according to claim 7, wherein said focus value is generated by filtering a signal generated in response to an image formed on a sensor using a first filter.

10. The camera according to claim 9, wherein said first filter comprises a high pass filter.

11. The camera according to claim 9, wherein said routines embodied in said processor, when executed by said processor, further cause said processor to compare focus values of at least one focus point in each of at least two recorded topologies, wherein (i) the at least one focus points in each of said at least two recorded topologies are located in the same or different positions, (ii) a difference between said focus values of the at least one focus points is used to determine the similarity of said at least two recorded topologies and (iii) one or more of said at least two recorded topologies is filtered with a second filter prior to comparing said focus values.

12. The camera according to claim 11, wherein said second filter interpolates the one or more recorded topologies.

13. The camera according to claim 1, wherein said routines embodied in said processor, when executed by said processor, further cause said processor to (i) position said first topology and said second topology to align respective correctly-focused points of the two topologies, (ii) compare said first topology and said second topology with (a) the respective correctly-focused points aligned, (b) the respective correctly-focused points at one or more different displacements or (c) the respective correctly-focused points aligned and at one or more different displacements, and (iii) generate an average focus value difference value for each comparison of said first topology and said second topology by averaging focus value differences determined for each focus point of said first topology and said second topology at a particular alignment, wherein (i) when the average focus value difference value is smaller than a predetermined threshold, the first and the second topologies are considered similar and (ii) when the average focus value difference value is greater than or equal to the predetermined threshold, the first and the second topologies are considered different.

14. The camera according to claim 13, wherein said average focus value difference value is determined using a weighted average.

15. The camera according to claim 1, wherein said first topology represents a shape of a first portion of a focus value curve surrounding a first peak and said second topology represents a shape of a second portion of said focus value curve surrounding a second peak.

16. The camera according to claim 1, wherein said routines embodied in said processor, when executed by said processor, further cause said processor to terminate a full search early when a topology of a current peak is similar to the first topology that was previously recorded and move a lens to a lens position of the first topology.

17. The camera according to claim 16, wherein during the full search operation, said processor is further configured to move an object lens first towards a correctly-focused point, then away from the correctly-focused point, and finally back to the correctly-focused point after searching the entire focus point range.

18. The camera according to claim 16, wherein said routines embodied in said processor, when executed by said processor, further cause said processor to terminate said full search operation prior to completely covering a predefined focus point range based upon a difference between a focus value of a top of a detected peak and a focus value of a foot of the detected peak exceeding a predetermined threshold value and continue said full search operation when said difference between said focus value of said top of said detected peak and said focus value of said foot of the detected peak not exceeding said predetermined threshold value.

\* \* \* \* \*